United States Patent [19]
Livingston

[11] Patent Number: 5,772,161
[45] Date of Patent: Jun. 30, 1998

[54] CAPILLARY BRACKET

[76] Inventor: Douglas N. Livingston, P.O. Box 415, Cibolo, Tex. 78108

[21] Appl. No.: 450,806

[22] Filed: May 25, 1995

[51] Int. Cl.[6] ........................................................ F16L 3/08
[52] U.S. Cl. .................... 248/74.2; 248/74.1; 248/206.5; 248/316.7; 249/91; 425/3; 425/117; 425/123; 425/175; 425/DIG. 33
[58] Field of Search ................................ 248/74.1, 74.2, 248/206.5, 316.7; 425/84, 85, 3, 117, 123, 175, DIG. 33; 249/91; 264/274, 275

[56] References Cited

U.S. PATENT DOCUMENTS

| | | | |
|---|---|---|---|
| 1,617,883 | 2/1927 | Walton | 248/49 |
| 1,760,458 | 5/1930 | Weber | 248/74.1 |
| 2,794,263 | 6/1957 | Cranmer | 248/206.5 |
| 2,994,937 | 8/1961 | Williams | 249/211 |
| 4,714,219 | 12/1987 | Mayse | 248/65 |
| 4,830,802 | 5/1989 | Ito et al. | 264/135 |
| 4,844,853 | 7/1989 | Ito et al. | 264/225 |
| 5,072,903 | 12/1991 | Griffin | 248/74.1 |
| 5,098,048 | 3/1992 | Chen | 248/74.2 |
| 5,267,710 | 12/1993 | Condon | 248/65 |
| 5,370,345 | 12/1994 | Condon | 248/65 |

*Primary Examiner*—David W. Wu
*Attorney, Agent, or Firm*—Kristin K. Jordan

[57] ABSTRACT

Brackets for holding a porous tube in a fixed position in a surrounding production mold material, which production mold is used in non-pressurized slip casting for forming vitreous china products, and to molding systems in combination with the brackets. The bracket is angled to provide first and second leg portions of elongated dimensions. The first leg portion is comprised of a magnetic material for removably adhering to magnets embedded in a case mold section for forming the production mold. Thus, the elongated dimension of the first leg portion corresponds to that which provides an adhering relationship to the embedded magnet. The second leg portion comprises a receptacle for holding a porous tube. In one embodiment of the invention, the receptacle is an aperture whereby the porous tube is threaded. In another embodiment, the receptacle is a depression whereby the porous tube snaps into position. Thus, the elongated dimension of the second leg portion corresponds to the desired spacing of the porous tube between the molding surface and the non-molding surface of the production mold. A plurality of dimpled projections are provided in the second leg portion adapted to provide an adhering relationship between the bracket and a surrounding mold material.

15 Claims, 3 Drawing Sheets

CAPILLARY BRACKET

FIELD OF THE INVENTION

The invention relates to brackets for holding a porous tube in a fixed position in a surrounding production mold material, which production mold is used in non-pressurized slip casting for forming vitreous china products, and to molding systems in combination with the brackets.

BACKGROUND OF THE INVENTION

In the manufacture of vitreous china products using non-pressurized slip casting processes, liquid clay, referred to in the industry as slip, is poured into a gypsum production mold. Water from the slip is absorbed into the production mold through its capillaries, thereby facilitating solidification of the slip. When the production mold is saturated with water, however, its capillary action is so weakened that the water has to be removed before the production mold can be reused. To accelerate water removal, a porous tube is embedded within the production mold when it is being formed from a case mold. Air pressure can then be applied through the porous tube to force the water from the production mold utilizing its capillary action.

The porous tube is desirably spaced between the molding and the non-molding surfaces of the production mold to optimize water removal. Fixing the porous tube in the production mold is accomplished during the manufacture of the production mold from the case mold. The porous tube is fixedly positioned by holding members. A conventional holding member has a magnetic component adjacent one end which removably adheres to a magnet embedded in a case mold section. The magnet is one of plurality of magnets embedded in the case mold section to define a desired path of the porous tube. A receptacle adapted to receive a porous tube is provided at the opposite end of the holding member. The porous tube is woven through the receptacles of the holding members along the desired path as dictated by the embedded magnets. The gypsum production mold material is placed in the case mold sections and solidifies around the porous tube and holding members. The case mold sections are removed when the production mold is solidified, leaving the porous tube and holding members embedded in the production mold. The magnetic components of the holding members are flush with the non-molding surface of the production mold. Thus, the spacing of the porous tube from the molding surface of the production mold is necessarily dictated by the dimension of the holding member from its magnetic component to its receptacle for holding the porous tube.

According to one of the prior art, a holding member is constructed of a plastic material having a substantially cylindrical shape. The cylindrical member has annular upsets and is configured with a cavity at one end in which a magnetic component is embedded. A depressed receptacle adjacent the opposite end of the cylindrical member is adapted to receive a porous tube. However, the drawback of this configuration is that the holding member is comprised of at least two components. The expense to machine and assemble the plastic and the magnetic components is relatively costly. Further, mass production is necessarily at a low rate because of the relative complexity of the holding members.

A holding member for use with pressurized slip casting processes is disclosed in U.S. Pat. No. 4,830,802. Pressurized casting processes require a channel to be located directly beneath the molding surface of the production mold. This configuration facilitates water removal since water from the liquid slip is forced into the production mold under pressure. The holding member of this patent is similar to a nut in which a flexible line is threaded through its aperture. The holding member is magnetic for adhering to magnets embedded in the surface of a case mold section. When the production mold solidifies and the case mold sections are removed, the flexible line is extracted from the production mold, leaving the holding members and a channel located directly beneath the molding surface of the production mold. This holding member, however, is not suitable for non-pressurized slip casting processes.

Other holding members for use with pressurized slip casting processes are disclosed in U.S. Pat. No. 4,844,853. One embodiment is a nut configuration which is permanently bolted to a section of a case mold. A flexible line is threaded through the aperture of the nut. The nut is removed with the case mold sections after the production mold solidifies, leaving a hole in the production mold. The flexible line is extracted which leaves a channel directly beneath the molding surface of the production mold. A second embodiment is a holding member having a dome shaped configuration. A dent is adjacent the dome top in which a flexible line is press-fitted. A magnetic string is embedded in the lower face of the holding member for detachably adhering to a magnet embedded in a case mold section. While the holding member remains in the production mold when the case mold sections are removed, it is ultimately removed with the flexible line, leaving a hole and a channel in the production mold directly beneath its molding surface. Again, these embodiments are not suitable for non-pressurized slip casting processes. In addition, the holes left in the molding surface of the production mold by the holding members must be filled with resin.

SUMMARY OF THE INVENTION

In accordance with the present invention, a bracket comprises a holding member which is angled, preferably at substantially ninety degrees, to form two elongated leg portions. The angled holding member is constructed of a magnetic material to provide an adhesive relationship between a first leg portion of the angled holding member and a magnet which is embedded in a case mold section. The magnet is one of a plurality of magnets which are embedded in the case mold section along a desired path of a porous tube.

A second leg portion comprises a receptacle for holding a porous tube. The receptacle can be an aperture through which the porous tube is threaded. In the alternative, the receptacle is a depression in the second leg portion into which the porous tube is press-fitted. A plurality of dimpled projections are adjacent the second leg portion to form a roughened surface which provides a mechanical bond with the gypsum material of the production mold.

The elongated dimension of the second leg portion is dictated by the desired spacing of the porous tube between the molding and non-molding surfaces of the production mold. Preferably, the porous tube is equidistance between the two surfaces and thus, the elongated dimension of the second leg portion is such that the receptacle is positioned substantially equidistance between the molding and non-molding surfaces.

The elongated dimension of the first leg portion should be sufficient to provide the adhesive relationship between the angled holding member and the embedded magnets. However, minimizing the amount, and thus the cost, of the material is desirable.

The present invention also relates to the foregoing combination of the brackets and the case molding system for the manufacture of production molds.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE PREFERRED EMBODIMENT

Figure 1:
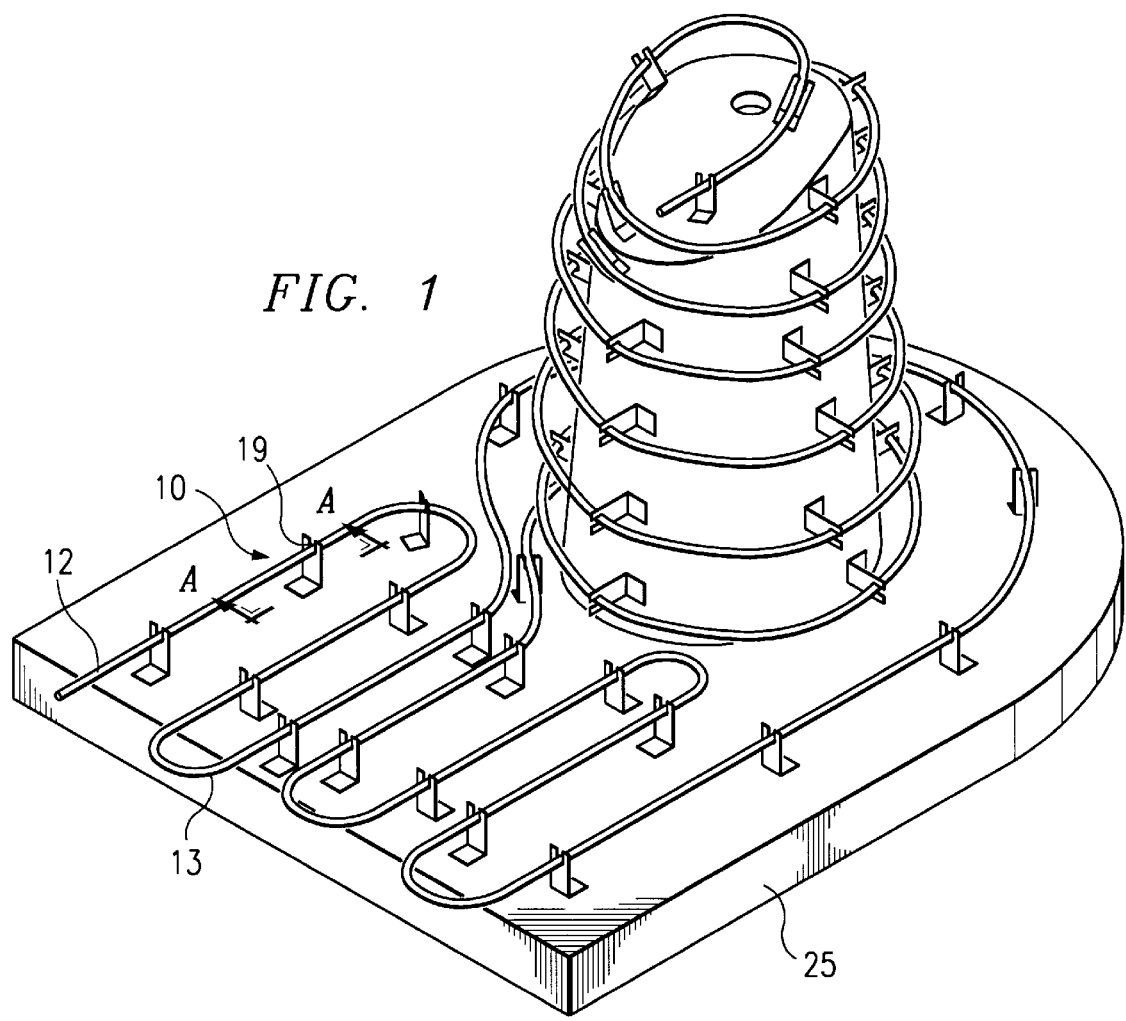
FIG. 1 provides a perspective view of a case mold section with brackets holding a porous tube.

Referring to FIG. 1, a plurality of brackets 10 in combination with a case mold section 25 define a desired path 13 for a porous tube 12 which is held by receptacles 19 provided in the brackets 10.

Figure 2A:
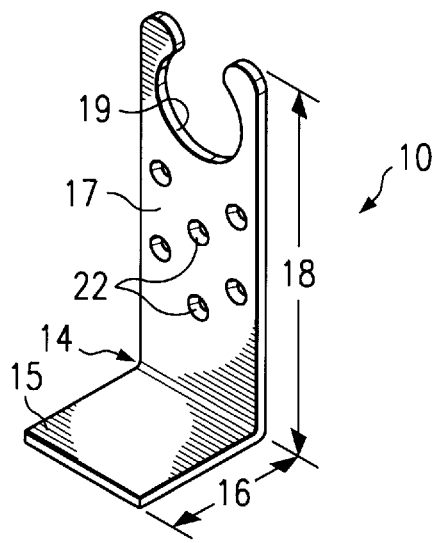
FIG. 2A provides a perspective view of a first embodiment of a bracket.
Figure 2B:
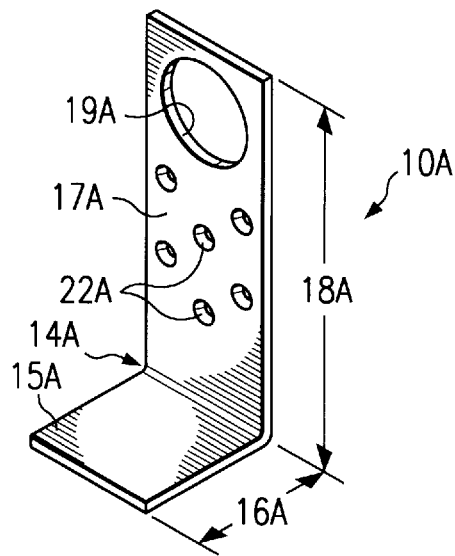
FIG. 2B provides a perspective view of a second embodiment of a bracket.

Referring to FIGS. 2A and 2B, each bracket 10, 10A includes an angled holding member 14, 14A having a first leg portion 15, 15A of elongated dimension 16, 16A, and a second leg portion 17, 17A of elongated dimension 18, 18A. The angled holding member 14, 14A preferably includes a substantially ninety degree angle between leg portions 15, 15A and 17, 17A, although it is to be understood by one skilled in the art that other angles can be used. Preferably the elongated dimension 16, 16A of the first leg portion 15, 15A is minor and the elongated dimension 18, 18A of the second leg portion 17, 17A is major which is greater than the minor elongated dimension 16, 16A of the first leg portion 15, 15A. However, it is to be understood by one skilled in the art that other dimensional configurations are suitable. A receptacle 19, 19A is provided in the second leg portion 17, 17A for holding a porous tube 12. In a first embodiment, the receptacle 19 is a depression adjacent an end of the second leg portion 17. A second embodiment of a receptacle 19A for holding the porous tube 12 is an aperture through which the porous tube 12 is threaded. It is to be understood that other receptacle configurations are suitable for holding the porous tube 12. For example, the receptacle 19, 19A may be adjacent the major elongated dimension 18, 18A of the second leg portion 17, 17A. In a preferred embodiment of the invention, the second leg portion 17, 17A of the angled holding member 14, 14A comprises a plurality of dimpled projections 22, 22A adjacent its elongated dimension 18, 18A. The dimpled projections 22, 22A provide an adhering relationship with a surrounding production mold material 35 as illustrated further in FIGS. 4B and 4C.

Figure 3:
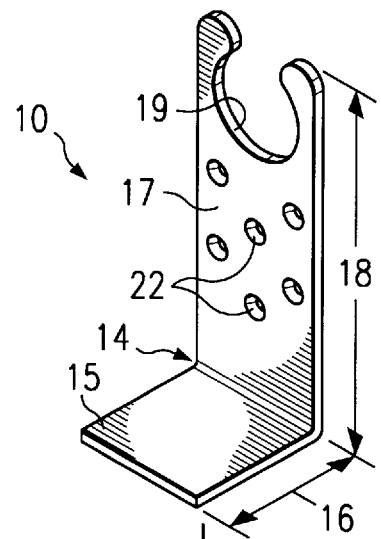
FIG. 3 provides an exploded view of a first embodiment of a bracket adhering to a magnet embedded in a portion of a case mold section.
Figure 3:
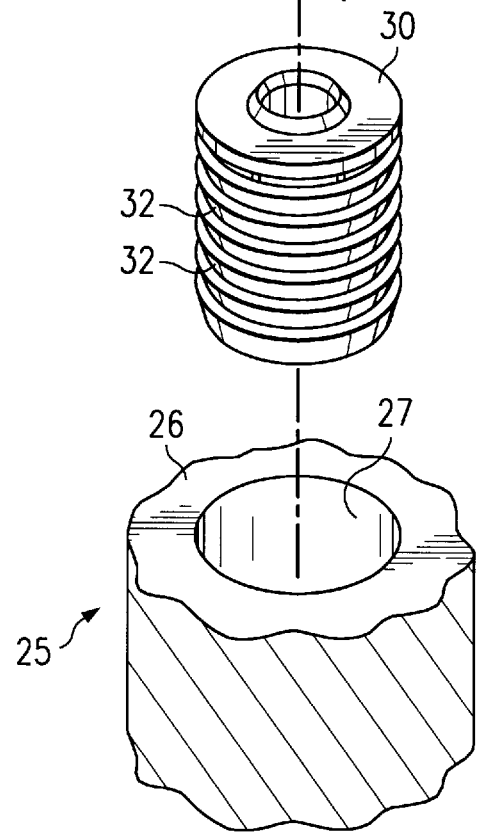

Referring to FIG. 3, the first leg portion 15 of the angled holding member 14 is comprised of a magnetic material which removably adheres to a magnet 30 embedded in the surface 26 of a case mold section 25. A plurality of magnets 30 are embedded in a case mold section 25 in a configuration to produce the desired path 13 of the porous tube 12, as illustrated in FIG. 1. In a preferred embodiment, the magnet 30 is cylindrical and includes a plurality of annular upsets 32 for bonding with a cavity 27 in the case mold section 25. However, it is to be understood that other bonding configurations between the magnet 30 and the case mold section 25 are suitable.

Figure 4A:
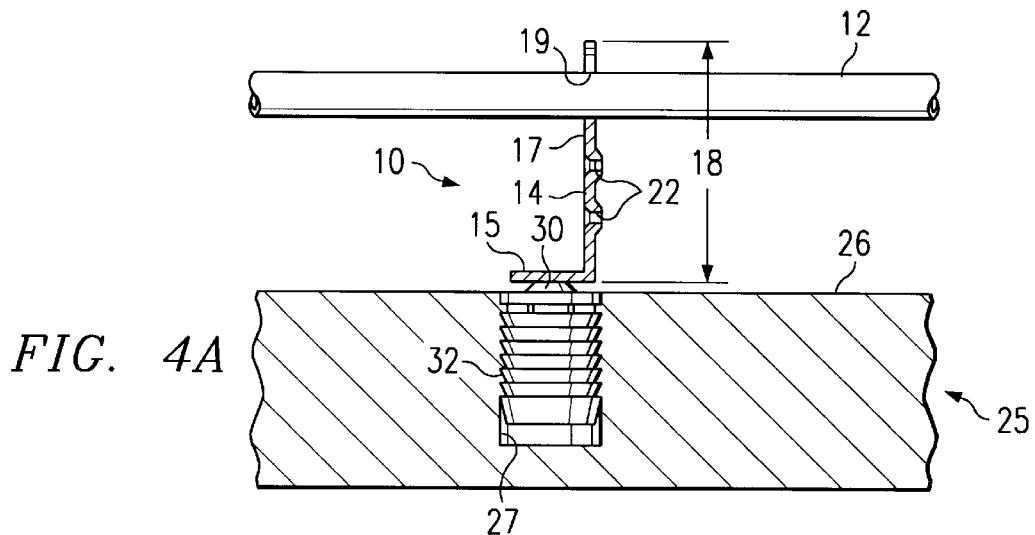
FIG. 4A provides a sectional view of a bracket holding a porous tube and adhering to a magnet embedded in a portion of a case mold section.
Figure 4B:
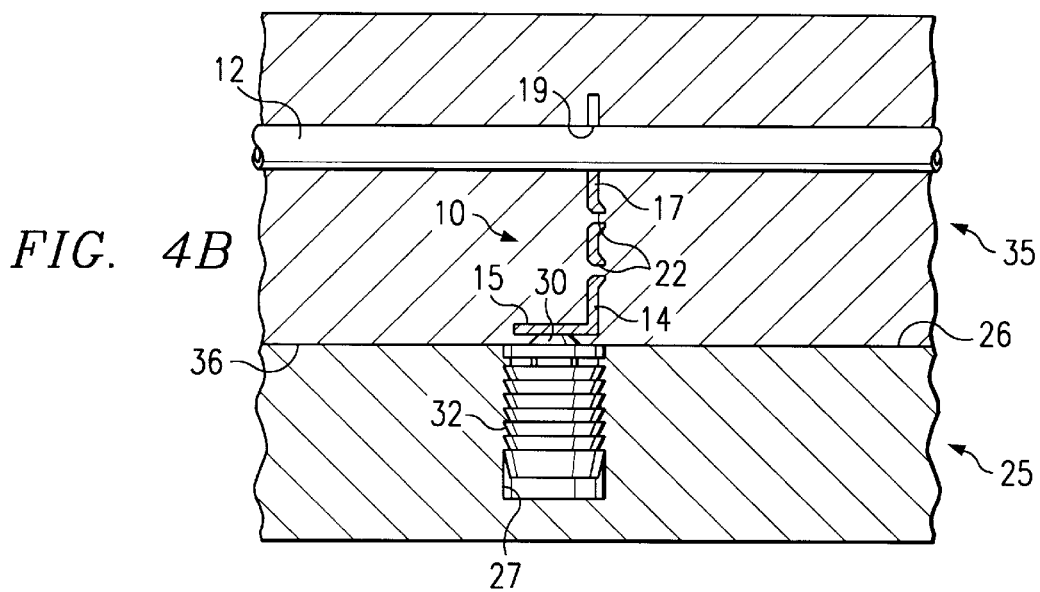
FIG. 4B provides a view similar to FIG. 4A except that the bracket and porous tube are also embedded in a portion of a production mold.
Figure 4C:
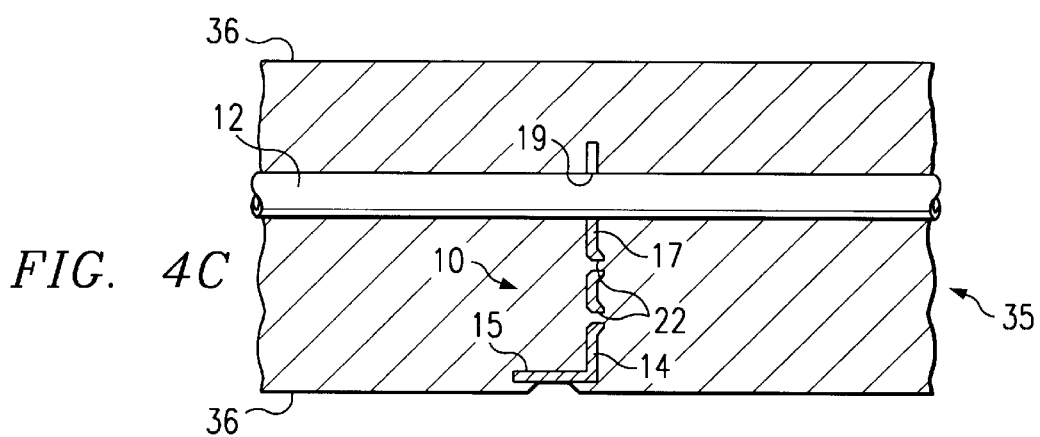
FIG. 4C provides a sectional view of a bracket holding a porous tube, both embedded in a portion of a production mold.

Referring now to FIGS. 4A, 4B and 4C, collectively, the bracket 10 comprising the angled holding member 14 having a substantially ninety degree angle is removably attached at its first leg portion 15 to a magnet 30 embedded in a case mold section 25. In one embodiment of the invention, the receptacle 19 of the second leg portion 17 holds a porous tube 12. A plurality of dimpled projections 22 are adjacent the major elongated dimension 18 of the second leg portion 17. The grooves 32 of the magnet 30 bond with the cavity material 27 of the case mold 25 such that the magnet 30 is substantially flush with the surface 26 of the case mold 25.

The bracket 10 and a porous tube 12 are disposed within a surrounding production mold material 35, as illustrated in FIG. 4B. The plurality of dimpled projections 22 of the second leg portion 17 forms a mechanical bond with the surrounding production mold material 35. The non-molding surface 36 of the production mold material 35 is flush with the surface 26 of the case mold 25.

The case mold section 25 is removed in FIG. 4C, leaving the bracket 10 and porous tube 12 in the surrounding production mold material 35. The first leg portion 15 of the angled holding member 14 is substantially flush with the non-molding surface 36 of the production mold material 35. The porous tube 12 is spaced between the non-molding surface 36 and the molding surface 37 of the production mold material 35. The spacing is accomplished by the major elongated dimension 18 of the second leg portion 17 and can be varied in production mold castings to a desirable spacing by altering the major elongated dimension 18.

Having described specific embodiments of the present invention, it will be understood that modifications thereof may be suggested to those skilled in the art, and it is intended to cover all such modifications as fall within the scope of the appended claims.

I claim:

1. A bracket for use in a molding system comprising:

an angled holding member having a first leg portion and a second leg portion, said first leg portion being formed of a magnetic material;

a receptacle provided in said second leg portion of said angled holding member adapted to receive a tubular member: and a plurality of dimpled projections provided in said second leg portion of said angled holding member adapted to provide an adhering relationship between said angled holding member and a surrounding production mold material.

2. A bracket, as recited in claim 1, wherein:

said first leg portion is of a minor elongated dimension and said second leg portion is of a major elongated dimension which is greater than said minor elongated dimension of said first leg portion.

3. A bracket, as recited in claim 1, wherein:

said receptacle of said second leg portion is an aperture adapted for threading a tubular member therethrough.

4. A bracket, as recited in claim 1, wherein:

said receptacle of said second leg portion is a depression adapted for fitting a tubular member therein.

5. A bracket, as recited in claim 2, wherein:

said angled holding member comprises a substantially ninety degree angle between said first and said second leg portions.

6. A bracket, as recited in claim 5, wherein:

said receptacle of said second leg portion is an aperture adapted for threading a tubular member therethrough.

7. A bracket, as recited in claim 5, wherein:

said receptacle of said second leg portion is a depression adapted for fitting a tubular member therein.

8. A molding system for molding objects from a molding material and a bracket for use in the molding system, the combination comprising:

a case mold section having a molding surface;

a plurality of magnetic members provided in said molding surface of said case mold section; and a plurality of angled holding members corresponding to said plurality of magnetic members, each of said angled holding members comprising:
- a first leg portion being formed of a magnetic material for adhering to said corresponding magnetic members,
- a second leg portion having at least one means for enhancing adhesion between each angled holding member and the molding material, and
- a receptacle provided in said second leg portion adapted to receive a tubular member.

9. A molding system and a bracket for use in the molding system, the combination as recited in claim 8, wherein:

said plurality of magnetic members and said plurality of angled holding members define a path for a tubular member.

10. A molding system and a bracket for use in the molding system, the combination as recited in claim 9, further comprising:

a tubular member disposed within said receptacles of said second leg portions of said angled holding members.

11. A molding system and a bracket for use in the molding system, the combination as recited in claim 10, wherein:

the means for enhancing adhesion is a dimpled projection provided in said second leg portion adapted to provide an adhering relationship between said angled holding member and a surrounding production mold material.

12. A molding system and a bracket for use in the molding system, the combination as recited in claim 10, wherein:

said receptacle of said second leg portion is an aperture adapted for threading a tubular member therethrough.

13. A molding system and a bracket for use in the molding system, the combination as recited in claim 10, wherein:

said receptacle of said second leg portion is a depression adapted for fitting a tubular member therethrough.

14. A molding system and a bracket for use in the molding system, the combination as recited in claim 11, wherein:

said first leg portion of each of said angled holding members is of a minor elongated dimension and said second leg portion of each of said angled holding members is of a major elongated dimension which is greater than said minor elongated dimension of said first leg portion.

15. A molding system and a bracket for use in the molding system, the combination as recited in claim 14, wherein:

each of said angled holding members further comprises a substantially ninety degree angle between said first and said second leg portions.

\* \* \* \* \*